Jan. 8, 1952     K. F. SPALDING ET AL     2,581,977
APPARATUS FOR SEALING PLASTICS
Filed Sept. 9, 1948     2 SHEETS—SHEET 1
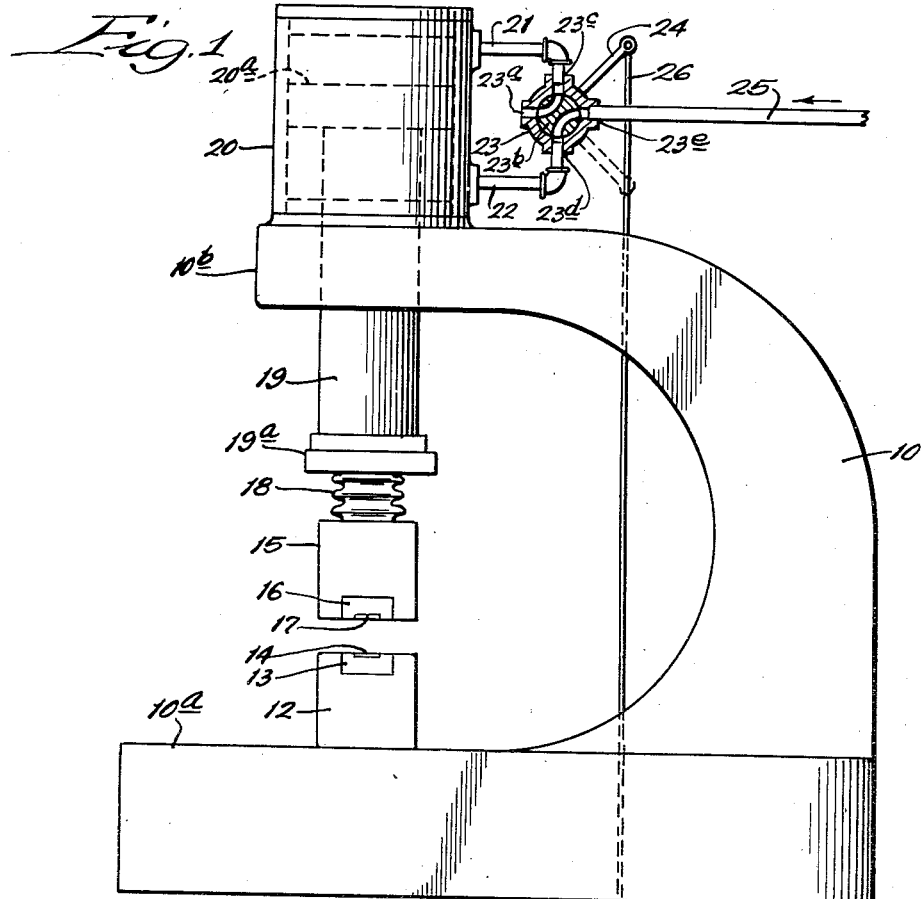
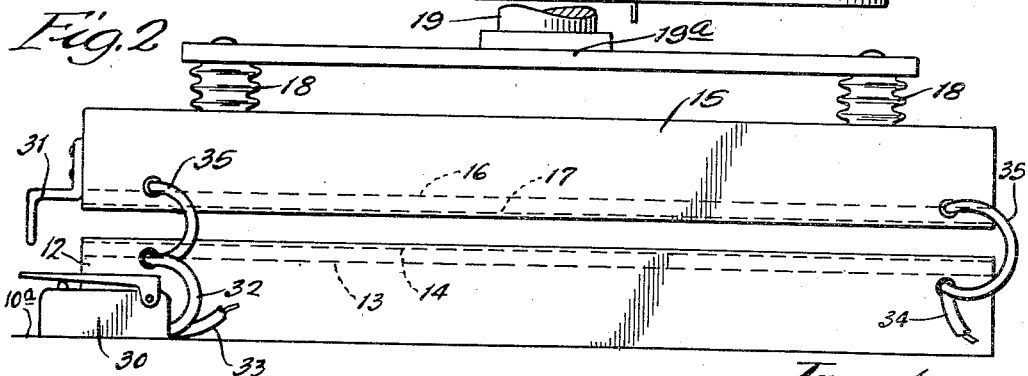
Inventors:
Kenneth F. Spalding
and Fred V. Collins,
By Damm, Ooms, Booth and Spangenberg,
Attorneys

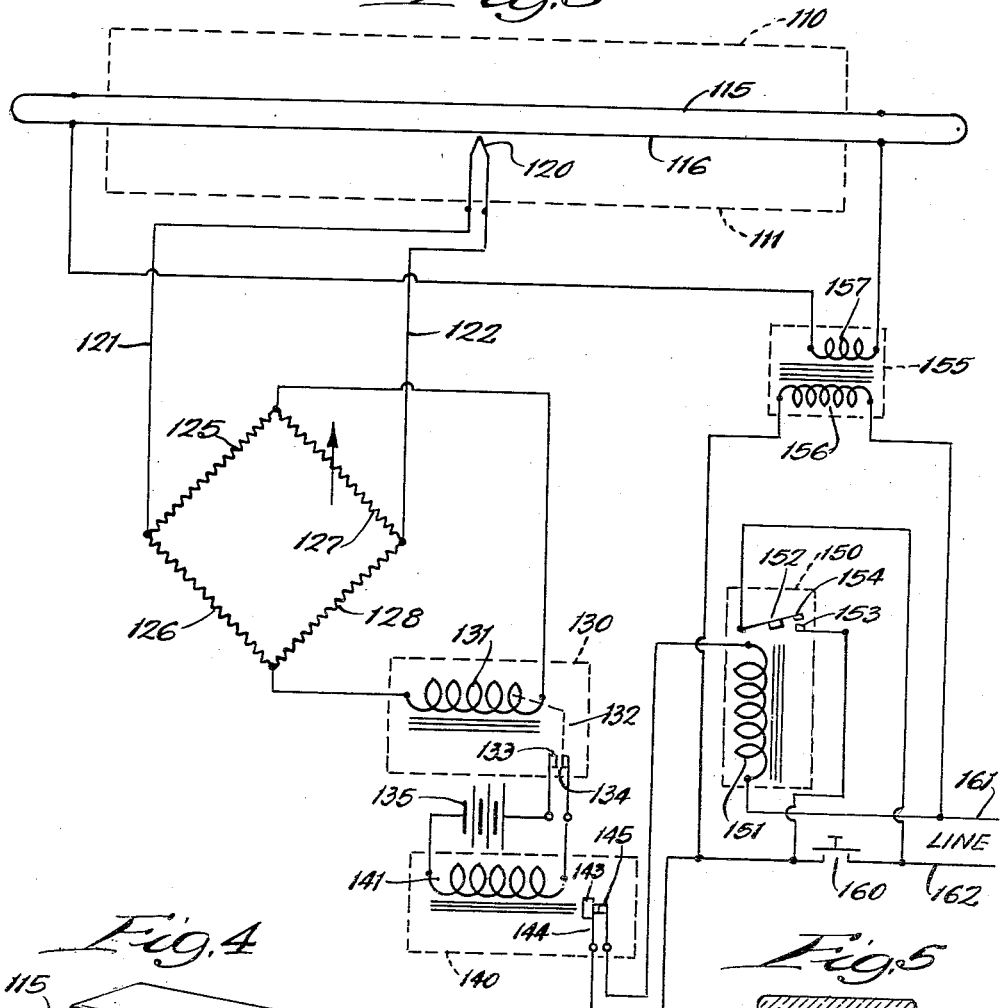
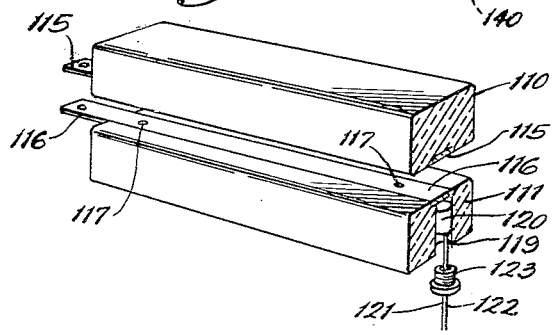
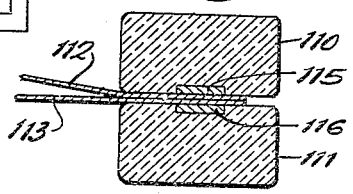

Patented Jan. 8, 1952

2,581,977

UNITED STATES PATENT OFFICE 2,581,977

APPARATUS FOR SEALING PLASTICS

Kenneth F. Spalding, Chicago, and Fred V. Collins, Des Plaines, Ill., assignors to William F. Stahl, Kenilworth, Ill.

Application September 9, 1948, Serial No. 48,458

8 Claims. (Cl. 219—19)

This invention relates to sealing plastics; in particular it concerns a novel method and apparatus by which a superior sealing action is obtained by the application of heat to plastic surfaces after they have been adjoined under compression in the desired position.

Prior-art plastic sealing techniques have, in general, employed one of two methods of achieving a sealing or bond between a pair of plastic surfaces. In one of these methods, a pre-heated sealing element, such as a hot roller or a pair of hot sealing bars, has been employed, the plastic surfaces to be bonded being adjoined and subjected to compression by the hot roller or between the hot sealing bars. The other method known to the prior art has involved bringing the plastic sheets together and then subjecting them to a powerful radio-frequency electric field, the dielectric losses thereby produced in the plastic being effective to heat the plastic to fusing temperature.

While it is more expensive, the radio-frequency method of sealing plastics has been much more successful with respect to a large number of plastic materials in general use, including polystyrene, polyethylene, and the various members of the polyvinyl family. The methods of the prior art, apart from the radio-frequency technique, have never been effective to achieve a strong, stable bond in such materials. When hot-bar or hot-roller sealing has been attempted, it has been found that the portion of the plastic material immediately adjacent the pre-heated bars or rollers has been raised to an excessive temperature, while the surfaces to be bonded together have failed to fuse.

We have discovered, and in this invention do provide, a method and means whereby plastic materials can be rapidly and effectively sealed together, with a bond as strong and stable as that produced by radio-frequency sealing, without the necessity for employing radio-frequency energy.

We have discovered that if a pair of plastic sheets are adjoined in position for sealing, placed under compression by mechanical members which are substantially cooler than the fusing temperature of the plastic, and then caused to rise in temperature by the application of heat, the temperature of the plastic under compression rises throughout at substantially the same rate, an excellent seal is produced between the adjoined surfaces, and no "running" or other undesirable effects of excessive temperature occur on the outer surfaces of the plastic under compression.

We have discovered, moreover, that the failure of prior-art "hot-press" sealing techniques has been in great degree because the existence of a large temperature differential between the inner and outer surfaces of plastic sheets adjoined for sealing inhibits the molecular reorientation which must occur within the plastic material in order to achieve a good bond.

In our invention, which might be described as a "cold-press" sealing machine, the plastic sheets to be sealed are held under compression by sealing bars which are initially at a temperature well below the melting point of the plastic. The bars and the plastic are then heated together simultaneously, and the net temperature differential between the coolest portion of the plastic and the hottest portion is very small.

In the embodiments of our invention hereinafter described, the sealing bars which compress the plastics to be sealed are provided with electrical heating elements which may be operated from conventional direct or alternating current sources. Switch means are provided for applying current to the electrical heating elements after the bars have engaged the plastic sheets and for turning off the current, to permit the bars to cool, after the seal has been accomplished.

In one of the embodiments of the invention hereinafter described, we have provided sensitive, automatic means for turning off the current through the electrical heating elements at the instant that the optimum temperature for sealing has been reached.

An object of this invention is to provide a method and means for effectively sealing together sheets of thermoplastic material without the necessity for employing radio-frequency energy.

Another object of this invention is to provide apparatus wherein sheets of thermoplastic material are adjoined under compression between relatively cool mechanical members and then sealed together by raising simultaneously the surface temperature of such mechanical members and the plastic sheets secured therebetween.

Still another object of this invention is to provide a plastic sealing machine which has automatic temperature control, adjustable to permit use of the sealing temperature best adapted for the particular plastic being treated.

A still further object of this invention is to provide a "cold-press" plastic sealing machine wherein sheets of thermoplastic material are compressed between relatively cool sealing bars which are thereafter raised in temperature to seal the plastic sheets together and automatically cooled after the seal is effected.

Our invention is illustrated, in two embodiments, by the accompanying drawings, of which Figure 1 is a side view, in elevation, of a plastic-sealing machine designed for making a straight-line seal such as might be useful in providing closure for plastic envelopes or other plastic containers; Fig. 2 is a fragmentary view, in front elevation, of the sealing bars employed in the machine of Fig. 1; Fig. 3 is a schematic showing of another embodiment of our invention wherein the heat supplied to the sealing bars of the machine can be turned off automatically when the optimum temperature for sealing has been reached; Fig. 4 is a perspective view, partly in section, of a pair of sealing bars constructed for use in the embodiment of the invention shown in Fig. 3; and Fig. 5 is a view in cross section of a pair of sealing bars showing how a pair of plastic sheets may be adjoined between the bars and held therein in position for heat-sealing.

In Fig. 1, the operative components of the plastic-sealing machine are supported on a frame 10 which comprises a horizontal, tablelike portion 10a and a secondary upper portion 10b which rises from the rear of the middle portion of table 10a and is bent forward to overhang table-portion 10a as shown. A sealing bar 12 is carried laterally by table 10a and is secured thereto by any suitable means (not shown). The upper surface of sealing bar 12 contains a recess within which is fitted a strip of insulating material 13; set into strip 13 is an electrical heating element 14, consisting of a strip of material having the properties of substantial electrical resistance and ability to withstand high temperatures. Many materials are well known and generally available for forming such heating elements. Sealing bar 12, insulating insert 13, and heating element 14 are all machined to provide a smooth, continuous upper surface. The second sealing bar 15 is positioned directly above sealing bar 12, and the lower surface of sealing bar 15 carries an insulating insert 16 and a heating element 17 located so as to register with the equivalent elements 13 and 14 in sealing bar 12. Upper sealing bar 15 is attached, by a pair of stand-off supports 18, to a lateral supporting bar 19a. At its central point, bar 19a is securely affixed to a piston rod 19 which rises vertically from bar 19a, through a suitable aperture in frame extension 10b, to enter pneumatic cylinder 20, which is positioned above and secured to frame extension 10b.

The upper end of piston rod 19 is joined to piston 20a, which is reciprocable within pneumatic cylinder 20.

A pipe 21 connects the upper end of cylinder 20 to port 23c on one side of control valve 23; a pipe 22 connects the lower end of cylinder 20 to port 23d on the opposite side of valve 23. A pipe 25 is provided to connect port 23e in valve 23 to any convenient source of pneumatic pressure, while port 23a in valve 23 is open to atmosphere. A rotary valve member 23b, movable within valve 23, contains ports operative, as may be seen from Fig. 1, alternately to connect pipe 25 to pipe 22, while venting pipe 21, or to connect pipe 25 to pipe 21, while venting pipe 22, according to whether movable member 23b is in the position shown in Fig. 1 or in a position 90° clockwise thereto. A lever 24 is rigidly connected to movable valve member 23b; an arm 26 is pivotally connected to the free end of lever 24. As shown, arm 26 extends downward to a point below the table 10a, where it may be connected to a foot pedal for convenient actuation by the operator of the machine.

As shown in Fig. 2, the ends of electrical resistance element 17 are connected to the corresponding ends of electrical resistance element 14 by a pair of flexible connecting cables 35. Cable 32 runs from one end of electrical heating element 14 to one terminal of a micro-switch 30. The other terminal of micro-switch 30 is connected to flexible electrical cable 33. Electrical cable 34 is connected to the end of electrical heating element 14 opposite micro-switch 30. Cables 33 and 34 may be connected to any suitable source of current, such as a conventional 115 volt power line.

Micro-switch 30 is mounted on table 10a near one end of sealing bar 12. A projecting finger-like member 31 is mounted on sealing bar 15, extending forward and downward so as to engage the arm of micro-switch 30 when sealing bar 15 is resting on sealing bar 12. Micro-switch 30 is normally open, and is closed when its arm is engaged by member 31.

In the operation of the plastic-sealing machine shown in Figs. 1 and 2, the operator will normally place the plastic sheets to be joined together, such as the open end of an envelope or other container, on the upper surface of sealing bar 12. The operator will then, by actuating arm 26, cause piston 20a to drop, thereby bringing sealing bar 15 down onto sealing bar 12 and compressing the plastic material tightly between the two sealing bars.

As sealing bar 15 drops, member 31 engages the arm of switch 30, closing the switch and causing electrical current to flow through heating elements 14 and 17. As the temperature of elements 14 and 17 rises, the temperature of the plastic compressed therebetween rises accordingly, and when the plastic reaches the temperature of fusion, the two plastic sheets are bonded together into a single homogeneous layer. Normally the time required to effect a bond is from one to three seconds. When sufficient time has elapsed for the bond to be formed, the operator shifts arm 26 to the position shown in Fig. 1, sealing bar 15 rises, and the current through heating elements 14 and 17 is shut off.

Since the mass of the heating elements 14 and 17 is very small, and since insulating inserts 13 and 16 prevent the transmission of any substantial quantity of heat to the bars 12 and 15, the sealing bars, including the heating elements 14 and 17, cool off to a temperature well below the melting point of the plastic within a fraction of a second after the current is cut off. It is therefore possible for the operator to keep the machine in substantially continuous operation, making a new seal every few seconds, and at the same time have each new pair of plastic sheets compressed between relatively cool members before they are heated.

Figs. 3 and 4 show an embodiment of our invention in which automatic means are provided for turning off the current through the heating elements carried by the sealing bars when they have reached the optimum temperature for sealing. The automatic feature of the embodiment of Figs. 3 and 4 assures that perfect seals will be obtained with those plastic materials which are highly critical as to sealing temperature, and, in addition, it relieves the operator from the responsibility for determining how long the plastic should be subjected to heat and pressure for proper sealing.

Fig. 3 being schematic, a pair of sealing bars 110 and 111 are therein shown diagrammatically. These bars may be in general similar to the sealing bars 12 and 15 of the Fig. 1 embodiment, although, as indicated in Fig. 4, it is preferable that the main body of the bars be formed of some insulating material, such as porcelain or other ceramic. As in the Fig. 1 embodiment, the sealing bars are shown in Figs. 3 and 4 as being adapted to form a straight-line seal. It will be understood that with respect to both the Fig. 1 and Fig. 3 embodiments, this choice as to the shape of the sealing bars is purely by way of example, since the bars may take any form appropriate to the task at hand.

As shown best in Fig. 4, sealing bars 110 and 111 have flat lower and upper faces respectively which are adapted to register with one another. Bar 110 has in its lower face a shallow longitudinal recess which carries a heating element 115, machined so as to fit flush with the face of bar 110. A similar recess in the upper face of sealing bar 111 carries a heating element 116. Heating elements 115 and 116 may be secured to the respective sealing bars 110 and 111 by any suitable means, such as flat head screws 117, threaded through apertures suitably countersunk to preserve a smooth surface on the cooperating inner faces of sealing bars 110 and 111.

Figs. 3 and 4 do not show any mechanical structure for mounting sealing bars 110 and 111; any suitable arrangement, such, for example, as that used in the Fig. 1 embodiment, may be employed to carry the bars and to provide for their being brought together and moved apart at the operator's will. It will be understood that whatever type of mechanical mounting is used should provide for registration of heating elements 115 and 116 when the bars are brought together.

As shown in Fig. 4, sealing bar 111 contains a vertical bore 119 positioned to intersect the recess carrying resistance heating element 116. Bore 119 is internally threaded near its lower end to receive threaded bushing 123. Within bore 119 a sensitive thermocouple unit 120 is carried, held in place by bushing 123, as indicated in Fig. 4. The lead wires 121 and 122, extending from thermocouple 120, pass out of bar 111 through the central aperture in bushing 123.

As shown schematically in Fig. 3, resistance heating elements 115 and 116 are connected in parallel for the flow of electric currents therethrough. Since bars 110 and 111 must move relative to one another, the leads connecting elements 115 and 116 are preferably formed of flexible cable. The terminals of resistance element 116 are connected across the secondary winding 157 of a power transformer 155. The leads 121 and 122 of thermocouple 120 are connected respectively to the opposite corners of a Wheatstone bridge comprising fixed resistors 125, 126, and 128, and variable resistor 127. Lead 121 is connected to the junction of resistors 125 and 126, while lead 122 is connected to the junction of resistors 127 and 128. The junction of resistors 125 and 127 is connected to one end of coil 131 of a sensitive moving-coil relay 130. The other terminal of coil 131 is connected to the junction of resistors 126 and 128.

Relay 130 should be a direct-current instrument responsive to very small currents; normally it will be designed in a manner similar to a d'Arsonval galvanometer—that is, coil 131 would be a delicately-balanced moving coil carrying a contact positioned to engage a fixed contact when coil 131 attains a critical deflection. In the drawing, relay 130 is represented schematically in the usual form; the moving contact is denoted 134 and the stationary contact has the reference numeral 133. As indicated, relay 130 has normally-open contacts, which close upon appropriate actuation of coil 131.

Contact 134 is connected to one terminal of coil 141 in relay 140. The other terminal of coil 141 is connected to one side of a current source 135, represented schematically in the drawing as a battery. The other terminal of current source 135 is connected to contact 133 on relay 130. Relay 140 may be of the conventional type having a stationary coil 141, an armature 143, and a pair of normally-closed contacts 144 and 145. It will be understood that while current source 135 is shown in Fig. 3 as a battery, it may be any convenient source of either direct or alternating current adapted to actuate the coil 141 of relay 140.

Relay 150 is a conventional relay having a stationary coil 151, an armature 152, and a pair of normally-open contacts 153 and 154. In the embodiment shown in the drawing, a main current source (designated LINE) is shown; the main current source may be the usual commercial line providing alternating current at 115 or 230 volts. Relay 150 should have a coil 151 designed for operation on alternating current of the particular voltage and frequency provided by the line.

One terminal of coil 151 is connected to contact 145 of relay 140; the other terminal of coil 151 is connected to line bus 161. Contact 144 on relay 140 is connected to one terminal of a normally-open push-button switch 160; the other terminal of switch 160 is connected to line bus 162. One terminal of primary coil 156 of power transformer 155 is connected to line bus 161; the other terminal of coil 156 is connected to contact 144 on relay 140. Contact 153 on relay 150 is connected to contact 144 of relay 140; contact 154 on relay 150 is connected to line bus 162.

In the operation of this embodiment of the invention, after a pair of plastic sheets have been lapped in the desired position and secured between sealing bars 110 and 111, push-button switch 160 may be manually actuated. (Fig. 5 shows, in cross section, a pair of plastic sheets 112 and 113 as they might be placed between sealing bars 110 and 111 in position for sealing.) When switch 160 is closed, current will flow from line bus 161 through coil 156 and switch 160 back to line bus 162. Simultaneously, current will flow from line bus 161 through coil 151, closed contacts 144 and 145, and switch 160 back to line 162. This will cause contacts 153 and 154 to close, and thereupon current will continue to flow through transformer winding 156 and relay coil 151 even though push-button switch 160 is released. Thus the apparatus is set into action by a momentary closing of switch 160.

The currents induced in secondary coil 157 of transformer 155 flow through heating elements 115 and 116, causing their temperature to rise and thus heating the plastic sheets 112 and 113 lapped between the sealing bars 110 and 111. As current continues to flow through heating element 116, thermocouple 120, positioned adjacent thereto, grows hot, and a minute potential is accordingly developed across its terminals. A portion of this potential, depending on the setting of resistor 127, is applied to coil 131 of sensitive relay 130, and accordingly a small current is caused to flow in coil 131. As the temperature of thermocouple 120 increases, the current through coil 131 grows progressively greater until, at some critical temperature, contacts 133 and 134 are caused to close. When this occurs, relay 140 is at once actuated and contacts 144 and 145 open. Thereupon current ceases to flow through coil 151, contacts 153 and 154 of relay 150 are opened; and current ceases to flow through the heating elements 115 and 116. The sequence of relay operations just described occurs substantially instantaneously; accordingly the plastic sheets secured between bars 110 and 111 at once begin to cool; and in a second or less will normally re-assume their solid state, bonded into a single piece.

As soon as the temperature of thermocouple 120 drops slightly from its peak value, the contacts of relay 130 open again and the contacts of relay 140 return to their normally-closed position. This re-sets the apparatus for another cycle, to be initiated by another actuation of push-button switch 160. No further current can flow through heating elements 115 and 116 until after push-button switch 160 is again actuated, however. Normally this will not occur until after the operator has removed the sealed plastic sheet and substituted a new pair of sheets between bars 110 and 111.

The critical temperature at which the relays operate to cut off the current can be precisely controlled by adjustment of resistor 127. Should resistor 127 be adjusted to that setting which balances perfectly the Wheatstone bridge, no potential will appear across coil 131 regardless of the temperature of thermocouple 120. As resistor 127 is varied from that point which balances the bridge, an increasingly larger percentage of the total potential developed by thermocouple 120 is impressed across coil 131. To place this invention in operation, therefore, that setting of resistor 127 is experimentally determined which gives relay operation at the optimum sealing temperature of the particular plastic in use. If the machine is to be used at various times on a variety of different types of plastic material, the setting of resistor 127 appropriate to each type of plastic can be determined and the knob or dial which controls resistor 127 can be directly marked or otherwise calibrated, so that when a new material is to be sealed by the machine, resistor 127 may at once be shifted to the proper setting. It will be understood that a simple resistance voltage-divider network may be used to control the critical temperature, if desired, in lieu of a Wheatstone bridge.

While we have shown, in the embodiment of the invention illustrated in Fig. 3, a manually-operable push-button switch as the means afforded for initiating a sealing operation, many variations of this arrangement may be made according to the requirements of the task to be performed.

In some applications, either of the embodiments of the invention herein described will operate satisfactorily with only one electric heating element, such as, for example, element 14 or element 116. In such cases, where a single heating element will heat adequately the plastic sheets to be sealed, the heating element on the other sealing bar may be dispensed with. It has been found that the use of a single heating element is often practicable when the plastic sheets to be sealed are extremely thin.

Many other variations and changes in detail from the structures herein shown may be made by persons skilled in the art without departing from the spirit of our invention.

We claim:

1. In apparatus for sealing plastics, means for holding plastic material in predetermined position for sealing, an electrical heating element adapted to heat such plastic material, a heat-sensitive control element positioned adjacent said heating element and responsive to heat from the same, and relay means operative responsively to the control element to cut off current to the heating element when said heating element reaches a predetermined temperature.

2. In apparatus for sealing together adjoined plastic surfaces, means for holding plastic material in predetermined position for sealing, a heating element adapted to raise the temperature of such plastic material, a thermocouple positioned adjacent said heating element and responsive to heat from the same, and relay means operative responsively to the thermocouple to cut off electric current to the heating element when the temperature of the thermocouple rises to a predetermined level.

3. In apparatus for sealing together adjoined plastic surfaces, a pair of sealing bars adapted to receive and hold plastic material in predetermined position for sealing, an electrical heating element carried by one of said bars adapted when carrying current to heat said plastic material, a thermocouple positioned adjacent said heating element and responsive to heat from the same, and relay means operative responsively to the thermocouple to cut off electric current to the heating element when the temperature of the thermocouple rises to a predetermined level.

4. In apparatus for sealing plastics, a pair of sealing bars adapted to receive and hold plastic material in predetermined position for sealing, an electrical heating element carried by one of said bars adapted when carrying current to heat said plastic material, a thermocouple positioned adjacent said heating element and responsive to heat from the same, relay means operative upon actuation to cut off current from the heating element, and a network comprising a variable resistor coupling the thermocouple to the relay means operative to actuate the relay means when the thermocouple reaches a critical temperature determined by the adjustment of the variable resistor.

5. In apparatus for sealing plastics, a pair of sealing bars adapted to receive and hold plastic material in predetermined position for sealing, an electrical heating element carried by one of said bars adapted when carrying current to heat said plastic material, a thermocouple positioned adjacent said heating element and responsive to heat from the same, relay means operative upon actuation to cut off current from the heating element, and a Wheatstone bridge comprising a variable resistor coupling the thermocouple to the relay means operative to actuate the relay means when the temperature of the thermocouple reaches a critical level controlled by the adjustment of the variable resistor.

6. In apparatus for sealing plastics, a pair of sealing bars adapted to receive and hold in predetermined position plastic material for sealing, an electrical heating element carried by one of said bars adapted when carrying current to heat said plastic material, a thermocouple positioned adjacent said heating element and responsive to heat from the same, control means for the heating element comprising a relay and a switch operative upon actuation of the switch to feed current to the heating element and upon actuation of the relay to cut off current to the heating element, and means coupling the thermocouple to the relay operative to actuate the relay when the thermocouple reaches a predetermined temperature.

7. In apparatus for sealing plastics, a pair of sealing bars adapted to receive and hold in predetermined position plastic material for sealing, an electrical heating element carried by one of said bars adapted when carrying current to heat said plastic material, a thermocouple positioned adjacent said heating element and responsive to heat from the same, control means for the heating element comprising a relay and a switch operative upon actuation of the switch to feed current to the heating element and upon actuation of the relay to cut off current to the heating element, and an electrical network comprising a variable resistor coupling the thermocouple to the relay operative to actuate the relay when the thermocouple attains a critical temperature determined by adjustment of the variable resistor.

8. In apparatus for sealing plastics, a pair of sealing bars adapted to receive and hold plastic material in predetermined position for sealing, an electrical heating element carried by each of said bars adapted when carrying current to heat said plastic material, a thermocouple positioned adjacent one of said heating elements and responsive to heat from the same, and relay means operative responsively to the thermocouple to cut off current to the heating elements when the thermocouple attains a predetermined temperature.

KENNETH F. SPALDING.
FRED V. COLLINS.

REFERENCES CITED

The following references are of record in the file of this patent:

UNITED STATES PATENTS

| Number | Name | Date |
|---|---|---|
| 2,093,745 | Westell | Sept. 21, 1937 |
| 2,289,618 | Young | July 14, 1942 |
| 2,325,094 | Ashworth | July 27, 1943 |
| 2,360,277 | Robertson | Oct. 10, 1944 |
| 2,369,362 | Marziani | Feb. 13, 1945 |
| 2,402,298 | Salfisberg | June 18, 1946 |
| 2,422,734 | Jung | June 24, 1947 |
| 2,460,460 | Langer | Feb. 1, 1949 |
| 2,488,422 | Mershon | Nov. 15, 1949 |